Patented Feb. 8, 1949

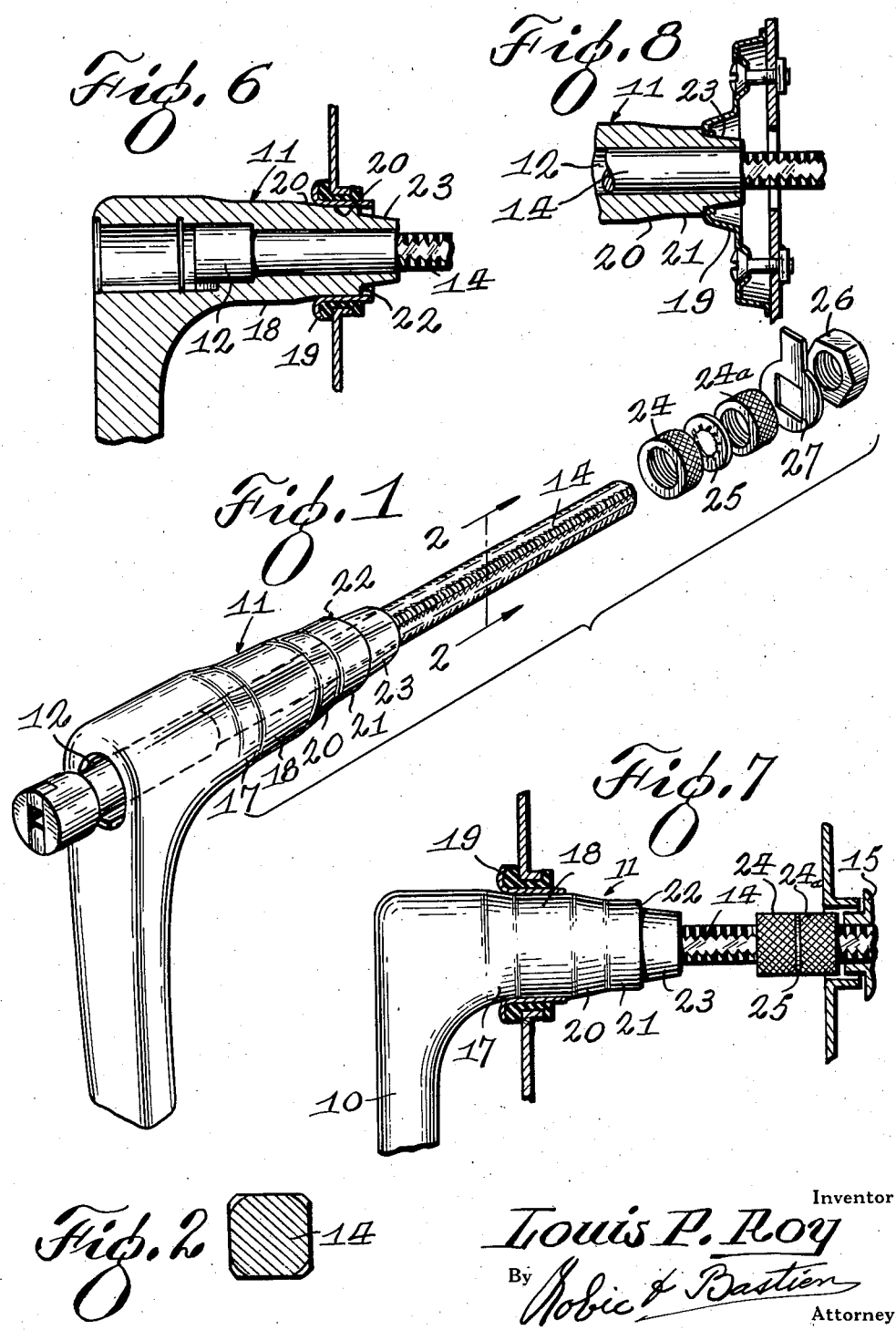

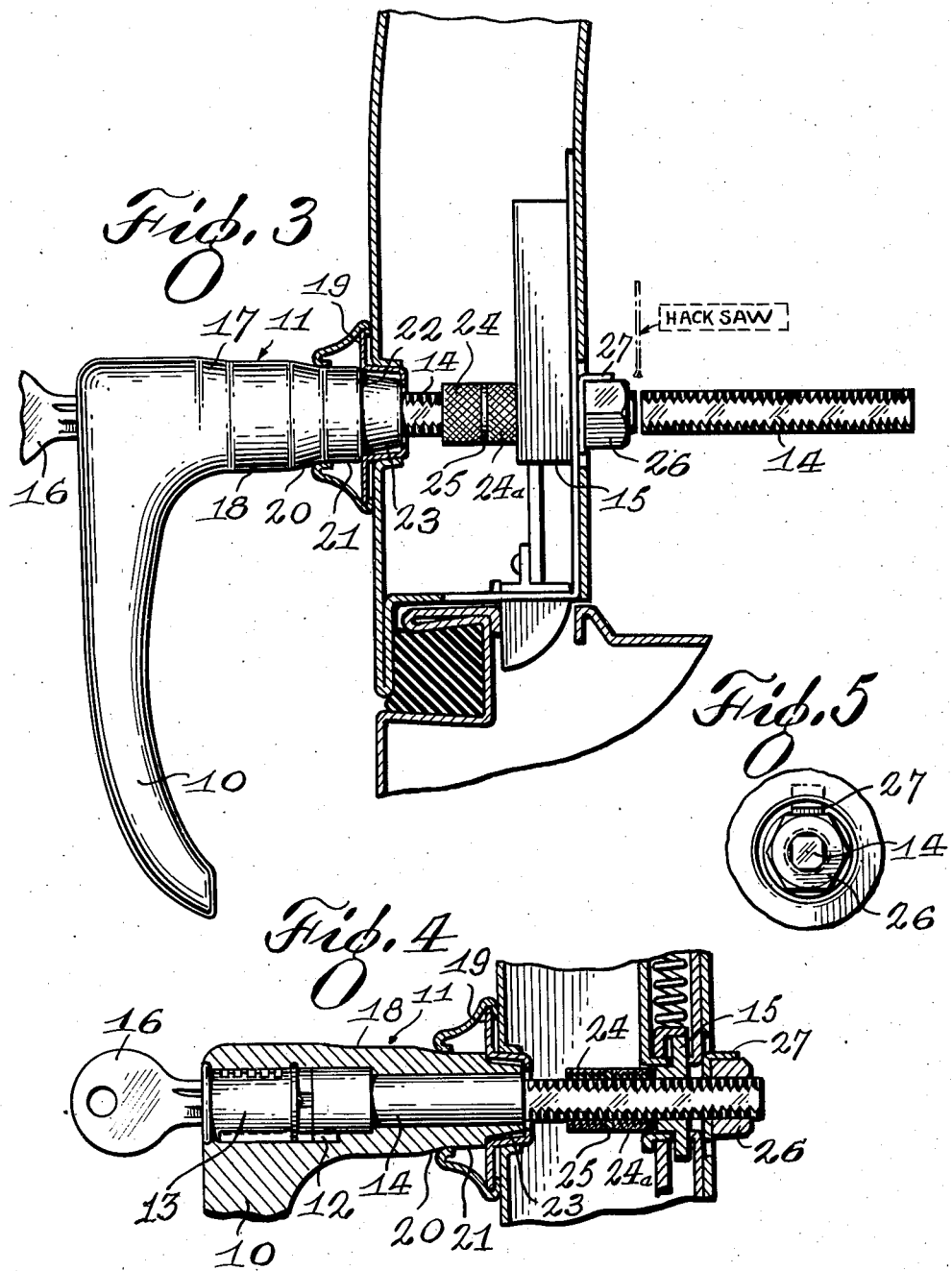

2,461,085

UNITED STATES PATENT OFFICE 2,461,085

REPLACEMENT DOOR HANDLE

Louis P. Roy, Montreal, Quebec, Canada

Application November 14, 1945, Serial No. 628,578

2 Claims. (Cl. 292—347)

This invention relates to locking handles and more particularly to a replacement locking handle which is adapted to fit the doors of substantially all makes of automobiles.

The dimensions of automobile locking handles vary considerably with the different makes of automobiles, a fact which causes no little expense and inconvenience to repair shop operators, automobile parts jobbers and automobile owners. The operators must provide sufficient space and capital to lay in large stocks of parts or suffer the possible loss of business due to the delay necessitated while a part is obtained to fit the automobile to be repaired or the owner may be required to wait a considerable time for the part. These and other objectionable features which are obvious are the result of the lack of standardization of parts as has been hereinbefore stated.

It is the principal object of this invention to provide a replacement locking handle which will fit the doors and compartments of substantially all makes of automobiles. Another object of the invention is to provide a device of this character which may be easily fitted to all makes of automobiles by any competent workman using the ordinary tools of his trade.

Still another object of this invention is to include the advantageous features of the modern locking handles, which are known to be old and are not claimed with the novel features of this invention.

Other objects of a more general nature are to provide a relatively inexpensive, durable and attractive device of the character set forth.

In brief, this invention contemplates the combination of a handle shank which is stepped or reduced at predetermined intervals and of predetermined dimensions to fit the escutcheons of the doors of substantially all makes of automobiles and a spindle and spindle locking assembly which may be cut to size and secured in operative position in an automobile door.

In the description of the invention, reference will be made to the attached drawings in which:

Figure 1 is an exploded perspective view of the invention.

Figure 2 is a transverse section through the spindle on the line of 2—2 of Fig. 1.

Figure 3 is a transverse section through an automobile door showing the locking handle in the final stages of assembly.

Figure 4 is a view similar to Fig. 3 in which the handle and latch mechanism have been sectionalized.

Figure 5 is an end view of the assembled locking handle.

Figures 6, 7 and 8 illustrate this invention in fragmentary detail in various makes of automobiles in which the adaptability of the device to fit different lock sizes and parts is clearly shown.

Referring in greater detail to the drawings in which similar reference characters designate corresponding parts throughout the several views, it will be seen that the device comprises a handle 10 and shank 11 arranged substantially at right angles to the said handle. A shouldered bore 12 extends longitudinally through the shank 11 and in which, at its outer or free extremity the lock barrel 13 is disposed, a spindle 14 occupies the remainder of the bore 12 and actuates the latch mechanism 15 upon rotation of the handle 10 when the lock barrel is manipulated by the key 16, otherwise the handle is free to rotate and no connection exists between the handle and the spindle. The foregoing describes briefly a conventional locking handle assembly and is intended to show that the invention does not effect the proven mechanism for locks of this character.

The novel feature of this invention is the stepped surface of the shank 11 in which the alternating frustro-conical or tapered portion and cylindrical portions provide a series of progressively smaller shank areas which are adapted to fit the escutcheons of the doors and trunk panels of substantially all well known makes of cars. This is clearly shown in Figures 3, 4, 6, 7 and 8 wherein, it will be noted, certain of the cylindrical or conical areas, or the combination of the two may be used according to the type of escutcheon with which the handle is associated.

In detail, the invention provides a frustro-conical or tapered section 17 which reduces the shank from its greatest diameter, that is where it meets the handle 10 to a cylindrical section 18 which in the present embodiment of the invention is $7/8''$ in diameter to fit the escutcheons or ferrules 19 of certain makes of automobiles. The cylindrical section 18 terminates at a second frustro-conical or tapered section 20 which reduces the diameter of the shank to $3/4''$ at the cylindrical section 21 which in turn is adapted to fit the escutcheons of certain makes of automobiles. The conical section 20 provides a plane in cross section which measures, diametrically $25/32''$ to fit a specific handle escutcheon used on certain makes of automobiles. The cylindrical section 21 terminates at a shoulder on the shank 11 which reduces the said shank from $3/4''$ diameter of the section 21 to $21/32''$ of the frustro-conical or tapered section 23 at the extremity of the shank. The tapered section 23 is reduced from 21/32" at the shoulder to 9/16" at the extremity. This last named section 23 permits a proper fit in the escutcheons of other makes of automobile door and trunk locks with various intermediate diameters from 21/32" to 9/16".

It should be noted here that there has been described in detail the dimensions necessary to fit the escutcheons of substantially all makes of automobiles, nevertheless the invention is not to be limited to the dimensions given, it being obvious that other dimensions may be used should changing conditions warrant it without departing from the spirit and principle of the invention. Furthermore there may be, within the limitations imposed by construction, provided additional sections of different diameters should it be necessary.

The spindle 14 is sufficiently long to extend from the handle to the latch mechanism 15 of all makes of automobiles. The spindle 14 is 7/16" square with rounded edges providing a 3/8" thread. This square spindle is adapted to fit and operate the roll back of latch mechanisms, having either square or oblong openings. Threadably engageable on the spindle 14 are two sleeves, 24, 24a which measure ½" outside diameter. The sleeves are preferably separated by a serrated washer 25. The said sleeves may be secured at any required position on the spindle 14 by tightening them against the serrated washer 25, that is, so that they exert a force against each other. These sleeves may serve as a retainer for the escutcheon ferrule in certain instances and/or as spacers and positioning device for the assembly. The threaded spindle 14 and sleeves 24 and 24a permit adjustment to variable thicknesses and selection of bearing surface of proper size on the shank 11.

The locking handle assembly is held in position in the door by a nut 26 threadable on the spindle 14 which is locked by means of the tab washer 27. As shown particularly in Figure 3, when the device is installed the excess portion of the spindle 14 is cut off by a suitable cutting tool such as a hacksaw.

The dimensions given for the spindle and related parts are for the purpose of applying the invention to existing conditions and may be changed without departing from the spirit of the invention. Furthermore, the invention should not be limited to the lock barrel or latch mechanism shown, which is known to be old, as this invention may be used with any similar type of locking mechanism or on doors which do not have a locking mechanism in the handle.

I claim:

1. In a door handle, a cylindrical shank provided with a plurality of constant-diameter sections spaced on the shank and decreasing in relative diameter from one to the next, tapered portions between said sections; a square spindle having threaded corners associated axially with the shank, and a nut threaded on the spindle for shank-locating purposes and for preventing withdrawal of the handle when same is associated with a door.

2. In a replacement door handle for motor vehicles, a shank constituted of a number of cylindrical sections arranged in diminishing stepped relation, tapered portions disposed between the sections, a square threaded-corners spindle axially secured to the small end of the shank, a nut engaged with the spindle for holding the handle relative to a door, and a tab washer on the spindle engageable with the nut for locking same.

LOUIS P. ROY.

REFERENCES CITED

The following references are of record in the file of this patent:

UNITED STATES PATENTS

| Number | Name | Date |
|---|---|---|
| 855,177 | Jack | May 28, 1907 |
| 1,532,765 | Ledin | Apr. 7, 1925 |
| 1,910,125 | Root | May 23, 1933 |
| 1,917,436 | Devereaux | July 11, 1933 |
| 1,985,223 | Anderson | Dec. 25, 1934 |
| 2,008,212 | Jarvis | July 16, 1935 |